United States Patent [19]
Kozora

[11] Patent Number: 5,358,543
[45] Date of Patent: * Oct. 25, 1994

[54] AIR TUBE STRUCTURE IN A GLASS CONTAINER FORMING MACHINE

[76] Inventor: Joseph W. Kozora, P.O. Box 559, Valencia, Pa. 16059

[*] Notice: The portion of the term of this patent subsequent to Aug. 18, 2009 has been disclaimed.

[21] Appl. No.: 37,512

[22] Filed: Mar. 26, 1993

Related U.S. Application Data

[63] Continuation of Ser. No. 521,327, May 9, 1990, abandoned.

[51] Int. Cl.⁵ .......................... C03B 9/38; C03B 11/12
[52] U.S. Cl. .......................... 65/319; 65/321; 65/362
[58] Field of Search ................. 65/215, 319, 321, 362, 65/219, 356

[56] References Cited
U.S. PATENT DOCUMENTS
3,607,206 9/1971 Foster .................... 65/321

FOREIGN PATENT DOCUMENTS
3025333 1/1982 Fed. Rep. of Germany ........ 65/319

*Primary Examiner*—Joye L. Woodard
*Attorney, Agent, or Firm*—George C. Atwell

[57] ABSTRACT

In an individual section machine for producing glass containers from molten glass, a sliding tube-in-a-tube arrangement forms part of an internal cooling air passageway for directing a pressurized air flow to a pressing plunger. A linearly-movable piston comprising a ring-shaped base with an upwardly-projecting rod portion, is supported within a cylinder casing, and the plunger is supported on a projecting end of the rod portion. The piston has a central opening in the bore of the rod portion which merges with a longitudinal elongated thin-walled tubular member. The tubular member is disposed to define an annular space between its outer surface and the internal bore sidewall. A fixed second tubular member projects centrally upwardly from the cylinder casing's base end and into the annular space whereby linear movement of the piston causes the first tubular member to telescopically slide within the fixed second tubular member and maintain an extensible-retractable air tube structure.

4 Claims, 4 Drawing Sheets

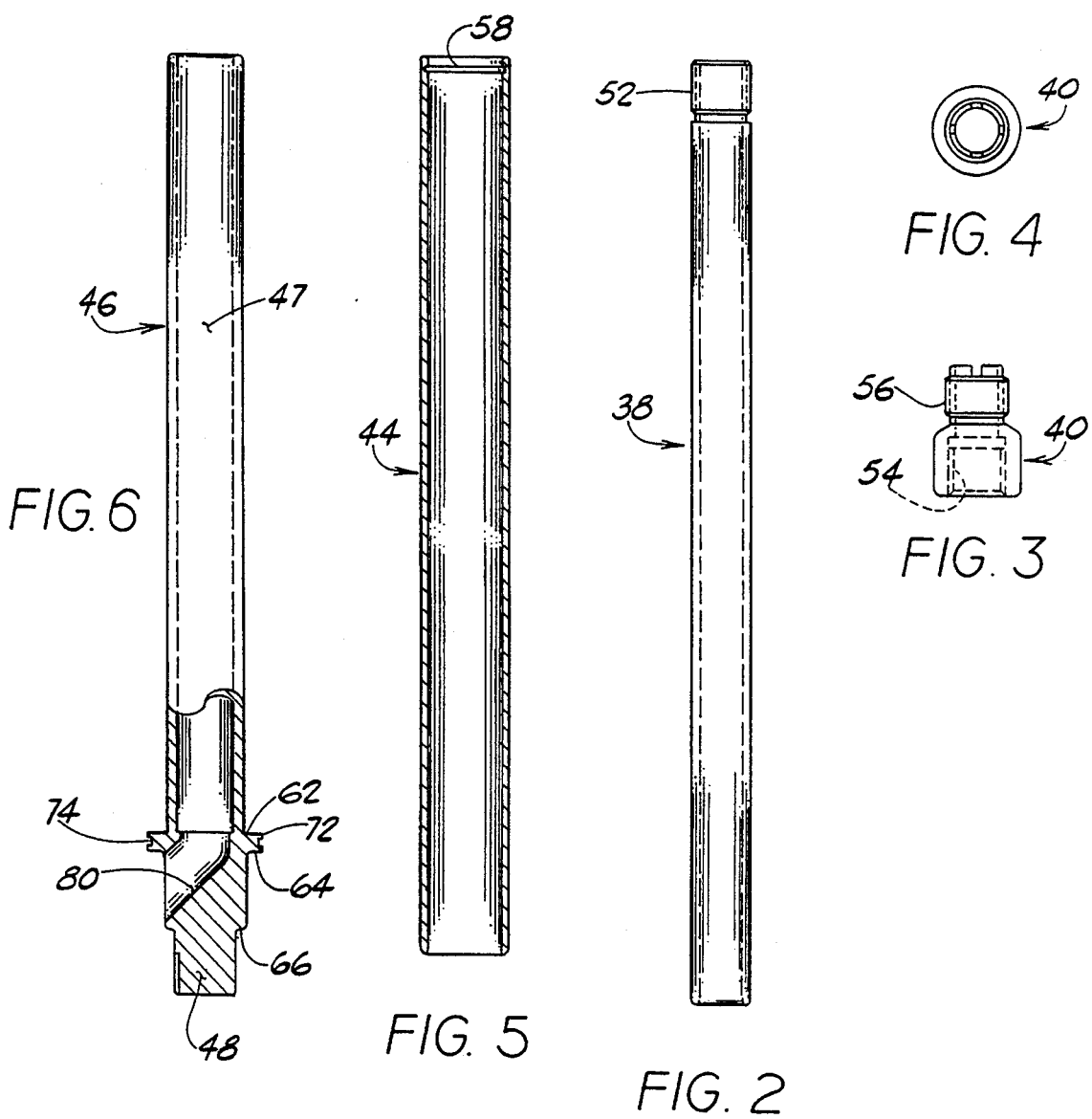

AIR TUBE STRUCTURE IN A GLASS CONTAINER FORMING MACHINE

This is a continuation of application Ser. No. 07/521,327, filed May 9, 1990, now abandoned.

BACKGROUND OF THE INVENTION

Anyone skilled in the art of glass container manufacture is familiar with the individual section machine in which a number of machine sections are mounted side-by-side on a single machine bed to operate in synchronization with each other while being independently adjustable. In the utilization of a press and blow method of glass container production in such a machine, discrete molten glass gobs are fed into an upwardly-open blank mold after which the mold is closed at the top by a baffle. Although a single gob mold may be utilized, it is more common to have a plurality of molds in a section, such as double gob or triple gob arrangements. Then, separate molten glass gobs are fed simultaneously to each mold in the section.

For each mold, a vertically-elongated pressing plunger is driven upwardly to press the molten glass into the blank mold and into an adjacent neck ring mold, forming a parison from the glass gob. The plunger is then retracted and the blank mold and the baffle are temporarily removed so that the parison can be inverted by the neck ring mold from the blank to a laterally adjacent blow mold station where the final formation of the glass container occurs by a blowing operation.

For each blank mold, there is a separate mechanism for supporting and driving a pressing plunger for initially forming the parison in cooperation with the mold, and this mechanism includes a vertically-elongated cylinder casing mounted to support an axially-oriented piston rod within the casing. The pressing plunger is removably mounted to the upper end of the piston rod whereby it can be cycled through its pressing operation by linear reciprocation of the piston rod.

Pressurized air is directed into the cylinder casing and upwardly against an annular base of the piston to cause it to move vertically, and means is provided to reverse the air pressurization within the casing to retract the piston during the timed pressing cycle. A separate pressurized air flow is provided to the mechanism for the purpose of plunger cooling. Typically, the cooling air flow enters through a port in the base or end cap of the cylinder and is directed centrally upwardly through a fixed air tube which projects from the base end of the cylinder and coaxially upwardly. The upper end of the air tube projects into a central bore in the piston rod which is in air flow communication with the hollow plunger on the piston rod portion's upper end.

A problem frequently encountered in the operation of the type of machine heretofore described is air leakage between the cooling air conduit or passageway to the plunger and the main chamber of the cylinder. Such leakage negatively affects the air pressure in the cylinder which determines the motion and position of the plunger. During a press and blow cycle, it is required that the plunger move through three successive positions: an invert-maximum down position; an intermediate or loading position when the glass gob is being loaded into the blank; and the pressing position when the gob is formed into the parison. The intermediate position must be held during the entire loading operation, without plunger drift, however, a cooling air leak into the main body of the cylinder can result in plunger drift or other disastrous distortion of the timed plunger operational cycle.

One way such an air leak often occurs is when fragmentary debris, such as fine glass particles, fall into the open piston rod upper end during plunger changeover. The fine particles fall down to the area of the annular seal about the upper end of the air tube and are often picked up by or even embedded in the seal so that repeated cycling causes surface scoring on the tube which will permit the relatively high-pressure cooling air to leak into the relatively low-pressure major chamber of the cylinder. Different types of packing, composite seals and ring combinations have been introduced over the years in an effort to obviate this problem but seal breach, usually due to the presence of undesirable particulant matter, remains a problem at the sliding seal juncture between the fixed air tube and the inside wall of the piston. Manufacturers continue to face the risk of plunger drift and costly down time when it occurs.

Another problem encountered in glass container forming machines of the type heretofore described, is the tendency of the elongated portion of the piston rod because of its length and the distance it must travel in its cycle, to whip-saw slightly relative to the axis of the cylinder in which it is carried. Such action is obviously amplified at the outer tip end of the plunger carried on the rod end. Keeping such a whip-saw action to a minimum requires the use of heavy-duty wide-spaced rings and bushings for supporting the piston and rod in the cylinder.

Still another problem in the type of machine described is the requirement for heavy-duty rings and bushings which bear the brunt of the impacting shock when the plunger and its supporting components move to the maximum down position. Because of the vertical orientation of the cylinder, only a small amount of air pressure is required to start the downward motion and then gravity and inertia contribute to its completion and a shock which must be borne by the rod bushings and rings at the termination of each downward stroke.

The present invention directly addresses the foregoing problems, as will be realized as this specification progresses.

SUMMARY OF THE INVENTION

This invention pertains generally to improved structure for a glass container forming machine, and more particularly pertains to air tube structure in a plunger cycling mechanism of the type used in an individual section machine for glass container production.

The present invention comprehends a plunger cycling mechanism in a glass container forming machine wherein a vertically-oriented cylinder defines an inner elongated major chamber with a piston slidably disposed within the chamber and having an elongated rod portion projecting upwardly from an annular piston bore coextensive with the chamber axis. The rod portion has a lower end integral to the base and a second end projecting outwardly through an opening in the cylinder's upper end and adapted for removable attachment thereto of a plunger.

Unique air tube structure, comprising dual tubes telescopically arranged to slide in a sealed tube-within-a-tube arrangement, act as a cooling air conduit between an air inlet port in the base of the cylinder and through the full length bore of the piston's portion to the plunger. The first tube is disposed within the piston rod bore and has its upper end in annular fixed sealed connection to the inner bore neck. The tube sidewall is in spaced relation to the inner rod wall defining the bore whereby an annular space is formed between the tube and the rod portion's inner surface.

The second tube is inserted and secured into a central opening on the inside surface of the end cap forming the base of the cylinder. This tube projects upwardly coextensive with the cylinder's axis and has its upper end projecting into the annular space between the first tube and the bore wall of the piston rod whereby, when the piston retracts in its plunger cycling operation, the first tube slidably moves downwardly within the second tube.

A unique bearing and seal arrangement maintains the first and second tubes of the air tube structure in sealed relation to each other and establishes, between the inner and outer first and second tubes, an annular air pocket which acts as a cushioning shock-absorber when the piston rod is retracted to its maximum down position and compresses the trapped air in the pocket. The spaced bearing and seal arrangement also significantly contributes to the stability of the piston in the mechanism during the plunger cycling operation by virtually eliminating whip-sawing and enabling the use of simpler and less costly seals and bearings between the piston and the cylinder chamber.

The design of the components of the air tube structure of the present invention and the manner in which it is installed relative to the bore of the piston rod prevents debris, such as fine glass particles, falling into the bore through the upper end of the rod, when the plunger is temporarily removed, from reaching the seals or otherwise contributing to a breach of the integrity of the cooling air passageway.

In addition to the attainment of the foregoing objectives, the air tube structure of the present invention provides, as compared to the prior art, a smoother and more direct air flow passageway having minimal pressure drop or variance in flow velocity.

The features and advantages of the present invention will be best appreciated from a full reading of the ensuing detailed description of the invention structure and function, with reference to the accompanying drawings.

BRIEF DESCRIPTION OF THE DRAWINGS

FIG. 2 is a side elevational view of an air tube component first shown in FIG. 1;

FIG. 3 is a side elevational view of a component of the air tube structure first shown in FIG. 1;

FIG. 4 is a plan view of the component shown in FIG. 3;

FIG. 5 is a view in vertical section of a tubular member component of the air tube structure first shown in FIG. 1;

FIG. 6 is a side elevational view, partially cut away in vertical section, of a component of the air tube structure first shown in FIG. 1;

DETAILED DESCRIPTION OF THE PREFERRED EMBODIMENT

Figure 1:
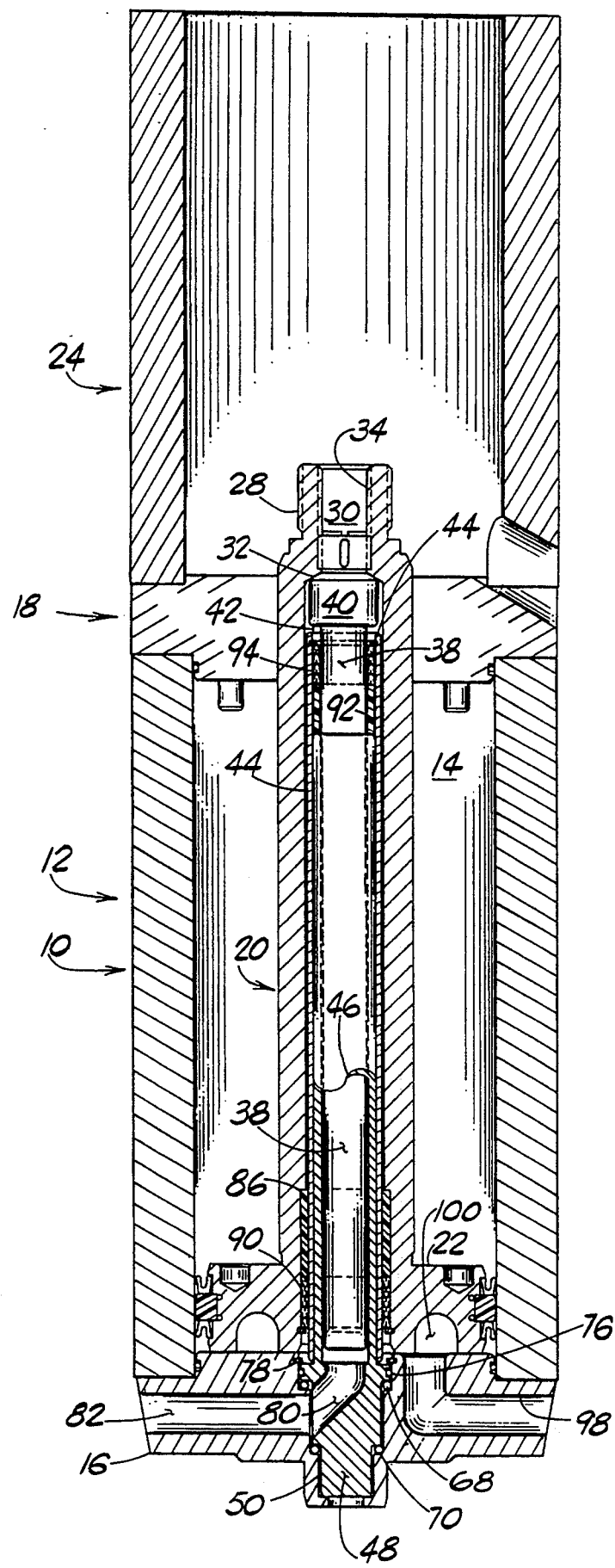
FIG. 1 is a view in vertical section illustrating the air tube structure in accordance with the present invention.

FIG. 1 illustrates a plunger cycling mechanism 10 for an individual section glass container forming machine, having a cylinder or casing 12 defining a chamber 14. The cylinder base or bottom is an end cap 16, and the upper end of the cylinder is defined by an intermediate cap 18. Extending axially upwardly through the chamber 14 is a piston 20 having an annular lower end or base 22 and a rod portion 23. Piston 22 is adapted for air-driven linear vertical movement to cycle a plunger (not shown) in a press and blow operation. A circular casing 24 is disposed above the cylinder 12 and serves to contain plunger positioning elements not shown in FIG. 1. Also not shown in FIG. 1 are the seals and bearings which would be supported by the intermediate cap, about the rod portion 23, to facilitate its reciprocal operation. For details of such structure, reference may be made to prior art FIG. 8 of the drawing, and for a more detailed understanding of the structure and operation of an individual section machine generally, reference should be made to the Ingle U.S. Pat. No. 1,911,119 or certain patents issued to G. E. Rowe, particularly U.S. Pat. Nos. 2,508,890; 2,702,444; and 2,755,597.

Beginning at the upper end 28 of the rod portion 23, a central circular full-length bore 30 is provided within the piston rod 20. Within the bore 30 is an annular shoulder 32 separating a narrowed short bore segment 34 from the major wider bore portion therebelow which extends the remainder of the length of the piston 20 and is of uniform diameter.

Also shown in FIG. 1 is air tube structure including a first tube or tubular member 38, the upper end of which is secured within the upper end of the rod portion 23 by a connecting member 40. Between the inside wall surface of the rod portion 23 and the tube 38 is an annular space 42, and contained within the annular space 42 is a second tube or tubular member 44 which projects upwardly from the inward surface of the end cap 16. When the first member 38 and the second member 44 are disposed in a maximum down position, as shown in FIG. 1, the first member 38 interfits within and is substantially encompassed by the second member 44. Securably press-fit into the second tubular member 44 is a tube liner 46 having an upper tubular portion 47 and a lower end solid base portion 48 secured in a socket 50 in the end cap 16.

The first tubular member 38 is shown as it appears removed from the mechanism 10, in FIG. 2, and details of the tube base connector 40 are shown in FIGS. 3 and 4. FIG. 5 shows the second tubular member 44 as it appears removed from the mechanism, and FIG. 6 shows the tube liner 46. The tubular members 38 and 44 are of rigid relatively thin-walled construction. The liner 46 is also rigid, and its upper portion 47 is tightly press-fit into the tube 44. The tube 38 has an upper end 52 which is designed to be sealably threaded into a socket end 54 of the connector 40, and the narrow end 56 of the connector 40 is sealably threaded into sealed securement within the lower end of the bore segment 34 in the rod portion 23, as shown in FIG. 1.

The second tubular member 44 is held in its fixed operative position, projecting upwardly from the end cap 16, by means of the tube liner 46. The lower end of the tubular member 44 abuts an annular ledge 62 of the liner 46. The lower solid end or base portion 48 of the liner 46 has annular shoulders 64 and 66 which compress against O-rings resting on complementary shoulders 68 and 70 in the socket 50 of the end cap 16, as shown in FIG. 1. The base portion 48 (FIG. 6) also has an integral annular ridge 72 with an annular recess 74 to accommodate a seal ring 76 (FIG. 1). A circular snapring 78 fits into an accommodating annular groove at the upper end of socket 50 of the end cap 16 and projects outwardly over the upper surface of the ledge 72 to retain the liner 46 in secured fixed mounted position on the end cap 16. The liner 46 has an angled transitional opening 80 which is in sealed air flow communication with a cooling air opening or port 82 entering laterally through the body of the end cap 16.

The bore 30 of the rod portion 23, at its lower end, is widened to accommodate an annular bearing 86 and an annular seal 90 which are fixed to the rod portion 23 to slide against the outer sidewall surface of the second tubular member 44. Within the second tubular member 44, beginning at the upper end of the liner 46, an annular bearing 92 and an upwardly-successive annular seal 94 are fixed to the inside surface of the tubular member 44 to slide against the sidewall outer surface of the tubular member 38. The internal groove 58 in the upper end of tube 44 (FIG. 5) accommodates a snap-ring to retain the bearing 92 and seal 94 in position against the outer end of the liner 46.

Figure 7:
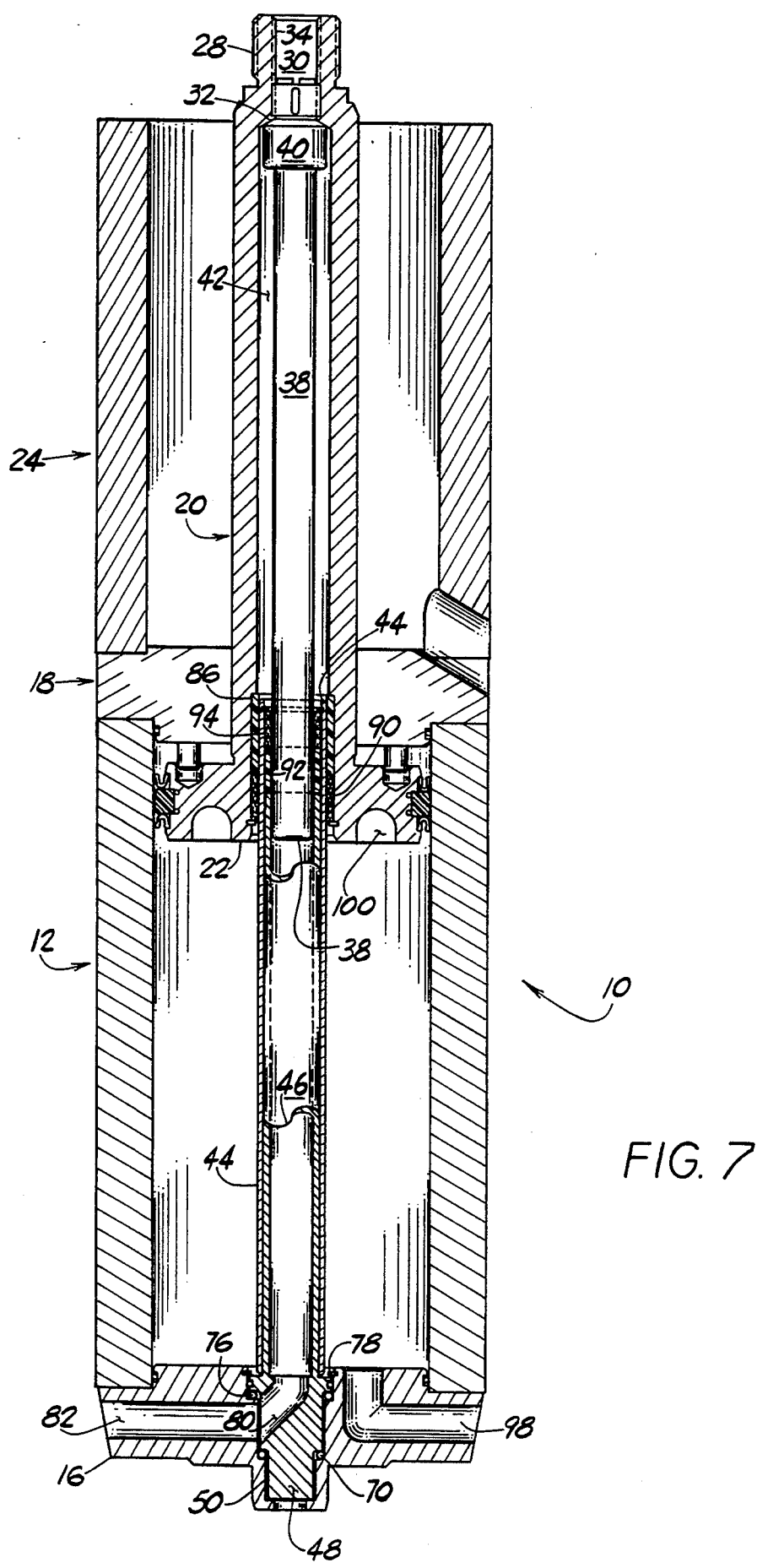
FIG. 7 is a view in vertical section illustrating the mechanism first shown in FIG. 1, but with certain elements thereof repositioned in accordance with the operation of the mechanism.

In the function of the mechanism 10 shown in FIGS. 1 and 7, pressurized air to drive the piston 20 is delivered to the chamber 14 through an air inlet port 98 and into an annular piston recess 100 to move the piston 20 from the maximum down position shown in FIG. 1 to the maximum up position shown in FIG. 7. By other means (not shown), the piston 20 is held in the intermediate blank-loading position during operation of the mechanism. Incoming cooling air flow moves from the port 82, through the transition 80 and upwardly through the lower coaxial tube arrangement 44 and 46. The air flow then moves through the upper tube 38, through the rod bore segment 34 and into the central air passage of the plunger. The means of exhausting the air flow from the plunger would not differ from that which is currently practiced in the art and, accordingly, details of such an arrangement in FIGS. 1 and 7 are not shown.

The tubular member 38 is assembled into the piston 20 prior to the being placed into its operative position within the cylinder 12. With the first tubular member 38 firmly secured by means of the connector 40 within the portion 23, the second tubular member 44 is positioned by inserting its open end up through piston 20. At this stage, the upper end 47 of the liner 46 has already been slidably permanently pressed into the second tubular member 44 whereby the liner portion 48 constitutes the lower end of the unit thus formed. The insertion of the liner end 48 into its installed position within the socket 50 of the end cap 16 is completed prior to the piston 20 and the end cap 16 being installed to the position shown in FIGS. 1 and 7 in the cylinder 12.

By the aforedescribed assembly of the interfitting first and second tubular members 38 and 44, the air within the annular space or pocket 42 is captured, whereby, during the linear movement downward of the piston 20 in the cylinder 12, the air is increasingly compressed and builds gradual resistance to the down stroke force, with such resistance reaching its maximum at the end of the down stroke. Hence, the air tube structure of the present invention acts as a cushioning shock-absorbing means of lessening the jolt of impact when the piston 22 reaches the position shown in FIG. 1.

It should be recognized from an examination of the structure shown in FIG. 7 that glass particle debris which may enter the upper end of the piston portion during the plunger changeover will fall downwardly through the tube 38 to rest in the area of the transition 80 and the port 82 until the pressurized flow of cooling air is restored. Such particles will then be swept upwardly with the air flow through the entire length of the air tube structure and into the plunger air passage to be carried outwardly with the exhaust flow of the mechanism. The lower end of the tube 38 leaves no space between its outer sidewall and the inside surface of the liner 46 through which particulant matter carried up through the tube structure can reach the bearing and seal area.

The extreme spacing between the bearing 86 and the bearing 92 in the air tube structure, as shown in FIG. 1, significantly contributes to maintaining the linear stability of the entire piston rod assembly during its extension and retraction whereby the tendency of the rod 20 and piston 22 to wobble or whip-saw is virtually eliminated.

Figure 8:
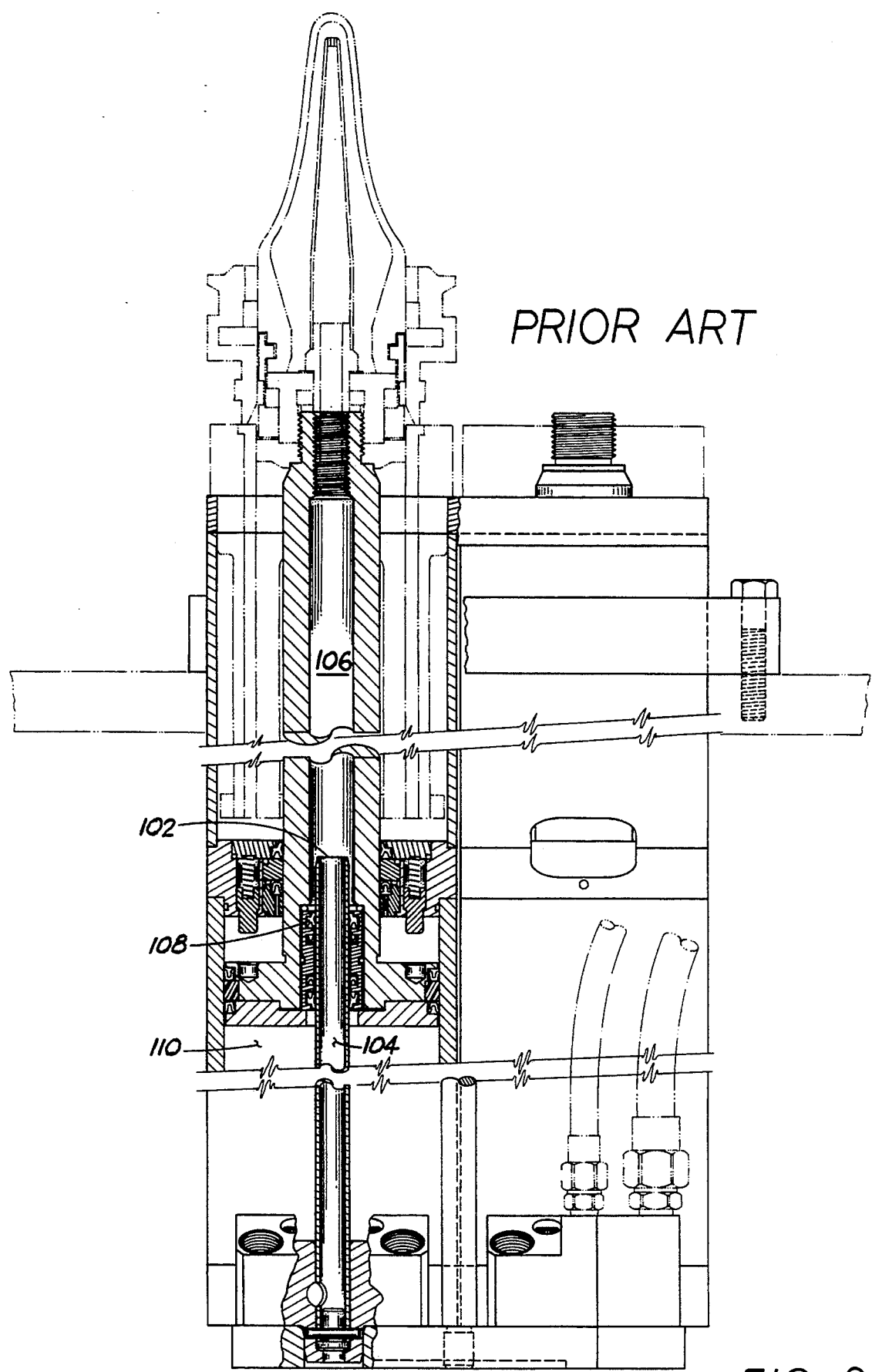
FIG. 8 is an elevational view in partial vertical section, illustrating an example of a typical prior art mechanism to which the improvements provided by the present invention are addressed.

It can be seen with reference to the prior art device illustrated in FIG. 8 that the air tube structure of the present invention eliminates the annular shelf 102 surrounding the upper end of the air tube 104 where particulant matter which finds its way into the hollow rod 106 will collect and become wedged between seals 108 and the outer sidewall of the tube 102 during plunger cycling. The resultant scoring to the outer sidewall surface of the air tube 104 creates leakage pathways to permit cooling air to seep to the major chamber area 110. The likelihood of such air leakage and the resultant undesirable plunger drift is a major advantage of the air tube structure-piston rod combination of the present invention as illustrated in FIGS. 1 and 7.

Finally, with reference to FIGS. 1 and 7, it should be noted that the arrangement by which the base 48 of the liner 46 is insertably contained within the socket 50 of the end cap 16 is purposely adapted to permit limited lateral shifting or "float" of the lower end of the unit comprising the tube 44 and the liner 6. The annular seals 68, 70, and 76 are sufficiently flexibly deformable that, in combination with the retaining ring 78 having an annular space between its inward edge and the sidewall of the tube 44, floating self-alignment of the air tube structure with the portion bore is attained, along with smoother non-binding reciprocal operation of the air tube structure and the piston.

The present invention has been described and illustrated in connection with a presently preferred embodiment, however, it is to be understood that other modifications and variations may be resorted to without departing from the spirit and scope of the invention, as those skilled in the art will readily understand. Such modifications and variations are considered to be within the purview and scope of the invention and the appended claims.

I claim:

1. A plunger cycling mechanism in a glass container forming machine comprising:

a cylinder defining an inner elongated chamber and having a bottom end cap and an opposite upper end, the bottom end cap further defining a central socket;

a piston slidably disposed within the chamber and having an annular base with an upwardly-projecting piston rod coextensive with the chamber axis;

the piston rod having a first end fixed to the base and a longitudinal bore, the lower end of which is a central opening in the base, and a second end projecting outwardly through an opening in the cylinder's upper end so that a plunger can be removably attached thereto;

air tube structure including a first elongated tubular member disposed within the longitudinal bore of the piston rod and defining an annular space between the tubular member's outer surface and the bore;

a second elongated tubular member having a first end secured to the bottom end of the cylinder and projecting, coextensive with the cylinder axis, into the annular space such that the second tubular member encompasses the first tubular member when both members are disposed in a down position within the cylinder and the first tubular member will telescopically slide within and along the second tubular member when the piston and the piston rod are slidably moved in the cylinder to a maximum up position; and the first end of the second tubular member being secured in the socket for limited radial floating movement therein.

2. The mechanism of claim 1 further comprising an air flow port extending through the body of the end cap in a direction lateral to the axis of the piston rod.

3. The mechanism of claim 1, wherein the entire air tube structure is contained substantially within the bore of the piston rod when the piston is in its fully retracted position.

4. The mechanism of claim 1 wherein retractive linear movement of the piston within the cylinder causes the first tubular member to become substantially contained within the second tubular member.

* * * * *